United States Patent
Anderson et al.

(10) Patent No.: US 9,928,118 B1
(45) Date of Patent: Mar. 27, 2018

(54) DETECTING TAPE ALLOCATION DEADLOCKS IN COMPUTER SYSTEMS USING TAPE DEVICE ALLOCATION SERIALIZER SOFTWARE

(71) Applicant: CA, Inc., Islandia, NY (US)

(72) Inventors: James E. Anderson, Duluth, GA (US); David R. Jones, Aliquippa, PA (US); William E. Boyd, Jr., McDonald, PA (US); David E. Rhodes, II, Coraopolis, PA (US); Robert L. Carpenter, Beaver, PA (US); Jason A. Tucker, Pittsburgh, PA (US)

(73) Assignee: CA, Inc., Islandia, NY (US)

(\*) Notice: Subject to any disclaimer, the term of this patent is extended or adjusted under 35 U.S.C. 154(b) by 337 days.

(21) Appl. No.: 14/069,663

(22) Filed: Nov. 1, 2013

(51) Int. Cl.
*G06F 9/46* (2006.01)
*G06F 9/52* (2006.01)

(52) U.S. Cl.
CPC ................... *G06F 9/524* (2013.01)

(58) Field of Classification Search
None
See application file for complete search history.

(56) References Cited

U.S. PATENT DOCUMENTS

| 2005/0038772 A1* | 2/2005 | Colrain .............. G06F 9/5061 |
| 2011/0016470 A1* | 1/2011 | Cain, III .............. G06F 9/528 718/101 |

\* cited by examiner

*Primary Examiner* — Lewis A Bullock, Jr.
*Assistant Examiner* — Melissa A Headly
(74) *Attorney, Agent, or Firm* — Stevens & Showalter, LLP (57) ABSTRACT

Monitoring resource allocation requests to computer resources shared between a plurality of computers includes detecting an allocation request by an application for a first set of the plurality of computer resources and assigning the application to a group, wherein each member of the group comprises a respective application having an associated allocation request for an associated set of the plurality of computer resources. Determining that the first set of the plurality of computer resources cannot be allocated by the application, and determining that the first application generates a function call instructing other members of the group, if any, to request allocation of their associated set of the plurality of computer resources results in incrementing a counter value corresponding to the group. A message is sent when the counter value exceeds a predetermined threshold.

27 Claims, 5 Drawing Sheets

DETECTING TAPE ALLOCATION DEADLOCKS IN COMPUTER SYSTEMS USING TAPE DEVICE ALLOCATION SERIALIZER SOFTWARE

BACKGROUND

The present disclosure relates to user data access, and more specifically, to serialized data access.

One aspect of many modern computer systems is that they may use large numbers of physical, or virtual, input/output devices to allow sequential digital data archiving and back-up such as that required, for example, by government-mandated regulations or other business goals. Each of these systems may include a number of respective applications such that a variety of different applications are attempting to exclusively access the same input/output devices at any one time.

One approach to preventing corruption from occurring when data is being written to these input/output devices is to serialize access to the input/output devices. Such serialization can be accomplished using software on each of the computer systems that coordinate access to the input/output devices. In particular, respective requests to access one or more input/output devices from the various applications can be arranged in a queue such that allocation of the input/output devices occurs sequentially in the order of the requests in the queue. In this way, each request waits for the requests that are earlier in the queue to finish.

BRIEF SUMMARY

According to one aspect of the present disclosure, a method of monitoring resource allocation requests to a plurality of computer resources shared between a plurality of computers, includes detecting an allocation request by a first application for a first set of the plurality of computer resources and assigning the first application to a group, wherein each member of the group comprises a respective application having an associated allocation request for an associated set of the plurality of computer resources. The method also includes determining that the first set of the plurality of computer resources cannot be allocated by the first application; and determining that the first application generates a function call, wherein the function call comprises data related to instructing other members of the group, if any, to request allocation of their associated set of the plurality of computer resources. The method further includes incrementing a counter value corresponding to the group when the first set of the plurality of computer resources cannot be allocated and when the first application generates the function call; and sending a message when the counter value exceeds a predetermined threshold.

According to another aspect of the disclosure, a computer program product for monitoring resource allocation requests to a plurality of computer resources shared between a plurality of computers, includes a computer readable storage medium having computer readable program code embodied therewith. The computer readable program code includes: a) computer readable program code configured to detect an allocation request by a first application for a first set of the plurality of computer resources; b) computer readable program code configured to assign the first application to a group, wherein each member of the group comprises a respective application having an associated allocation request for an associated set of the plurality of computer resources; c) computer readable program code configured to determine that the first set of the plurality of computer resources cannot be allocated by the first application; d) computer readable program code configured to determine that the first application generates a function call, wherein the function call comprises data related to instructing other members of the group, if any, to request allocation of their associated set of the plurality of computer resources; e) computer readable program code configured to increment a counter value corresponding to the group when the first set of the plurality of computer resources cannot be allocated and when the first application generates the function call; and f) computer readable program code configured to send a message when the counter value exceeds a predetermined threshold.

According to yet another aspect of the disclosure, a system for monitoring resource allocation requests to a plurality of computer resources shared between a plurality of computers, includes a processor coupled with a memory, said memory comprising code executable by the processor. The code configured, when executed, to monitor resource allocation by detecting an allocation request by a first application for a first set of the plurality of computer resources and assigning the first application to a group, wherein each member of the group comprises a respective application having an associated allocation request for an associated set of the plurality of computer resource. The code also configured to determine that the first set of the plurality of computer resources cannot be allocated by the first application, and determine that the first application generates a function call, wherein the function call comprises data related to instructing other members of the group, if any, to request allocation of their associated set of the plurality of computer resources. The code is further configured to increment a counter value corresponding to the group when the first set of the plurality of computer resources cannot be allocated and when the first application generates the function call; and send a message when the counter value exceeds a predetermined threshold.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
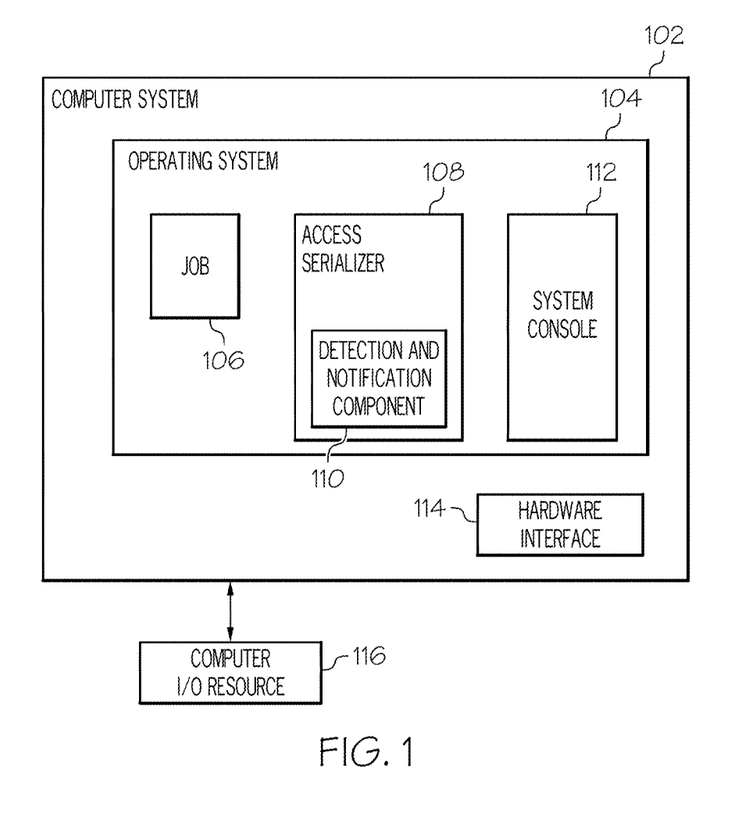
FIG. 1 illustrates an example computing system that may be deployed in accordance with the principles of the present disclosure.

Referring to FIG. 1, an example computing system 102 is illustrated that may be deployed in accordance with the principles of the present disclosure. The computer system 102 may, for example, have an operating system 104 in which one or more software applications or jobs may execute. The terms "job", "software application", and "application" are used interchangeably herein to refer to an executable process that is executing on a programmable computer system, usually within the control of a resident operating system. The computer system 102, for example, may be a mainframe system in which a job 106 can execute. Thus, an operator can define a particular job 106 (e.g., using a job control language (JCL) script) that causes one or more applications to execute and also specifies how to handle any input and output for these applications.

For example, output resulting from the job 106 may be passed through a hardware interface 114 to an input/output (I/O) resource 116. The I/O resource 116 may, for example, be a printer, a display such as a terminal or a console window, a hard-drive, an optical drive, or a tape drive. One of ordinary skill will recognize that such resources can be actual physical devices or a physical device logically organized as various virtual devices.

One example application that may be executing on the computer system 102 is an access serializer 108. The access serializer 108 manages how and when a job 106 may access the I/O device 116. In particular, the I/O resource 116 may be a shared resource as described in more detail with respect to FIG. 2. The access serializer 108 may coordinate access to the shared I/O resource 116 amongst a plurality of different computer systems that all are attempting to access the shared I/O resource 116. In operation, the job 106 may attempt to access the shared I/O resource 116 and the access serializer 108 detects that attempt. The access serializer 108 can then exchange messages with other computer systems sharing the I/O resource 116 to coordinate when the shared I/O resource 116 can be allocated to handle the request from the job 106.

Another application that may be executing on the computer system 102 is a system console 112 that can receive input from an operator (e.g., from a keyboard or mouse), receive input from other inter-networked computer systems, and display messages to an operator. The messages that are displayed may relate to an application (e.g., 106, 108) executing on the computer system 102 or relate to external messages received from other computer systems.

The access serializer 108 prevents two applications, or two jobs, from concurrently allocating a given shared I/O resource 116. Thus, respective requests by different applications to access the shared I/O resource 116 are serialized such that the shared I/O resource 116 is allocated to handle only one request at any moment in time. Once that request is handled, a next pending request is handled and this process repeats until all pending requests for the shared I/O resource 116 are handled.

Thus, there may be instances in which there is a delay between the time the job 106 requests access to the shared I/O resource 116 and the time that this resource is allocated to the job 106. In particular, the job 106 may request access to the shared I/O resource 116 and this request is detected, or handled, by the access serializer 108. The access serializer 108 generates an allocation request for the I/O resource 116 that is coordinated with any other computer systems that share access with the I/O resource 116. The access serializer 108 recognizes when the shared I/O resource 116 becomes available to handle this allocation request, and controls the exchange of data between the job 106 and the shared I/O resource 116.

The access serializer 108 can include a delay detection and notification component 110 that detects any delay that may occur once the access serializer 108 generates an allocation request for the shared I/O resource 116. This delay represents the time between when the access serializer 108 requests allocation of the I/O resource 116 and when that resource is allocated to handle that request. Some amount of delay will likely occur within the normal usage of the computer system 102 and the shared I/O resource 116, especially for a heavily used I/O resource 116. However, a predetermined threshold can be specified that represents a delay period that likely indicates that there may be some type of malfunction with the I/O resource 116 or with an application that is trying to access the I/O resource. Thus, once a delay is recognized that exceeds this predetermined threshold, the detection and notification component 110 can generate a message about the delay and display it within the system console 112 or transmit it to other computer systems.

Figure 2:
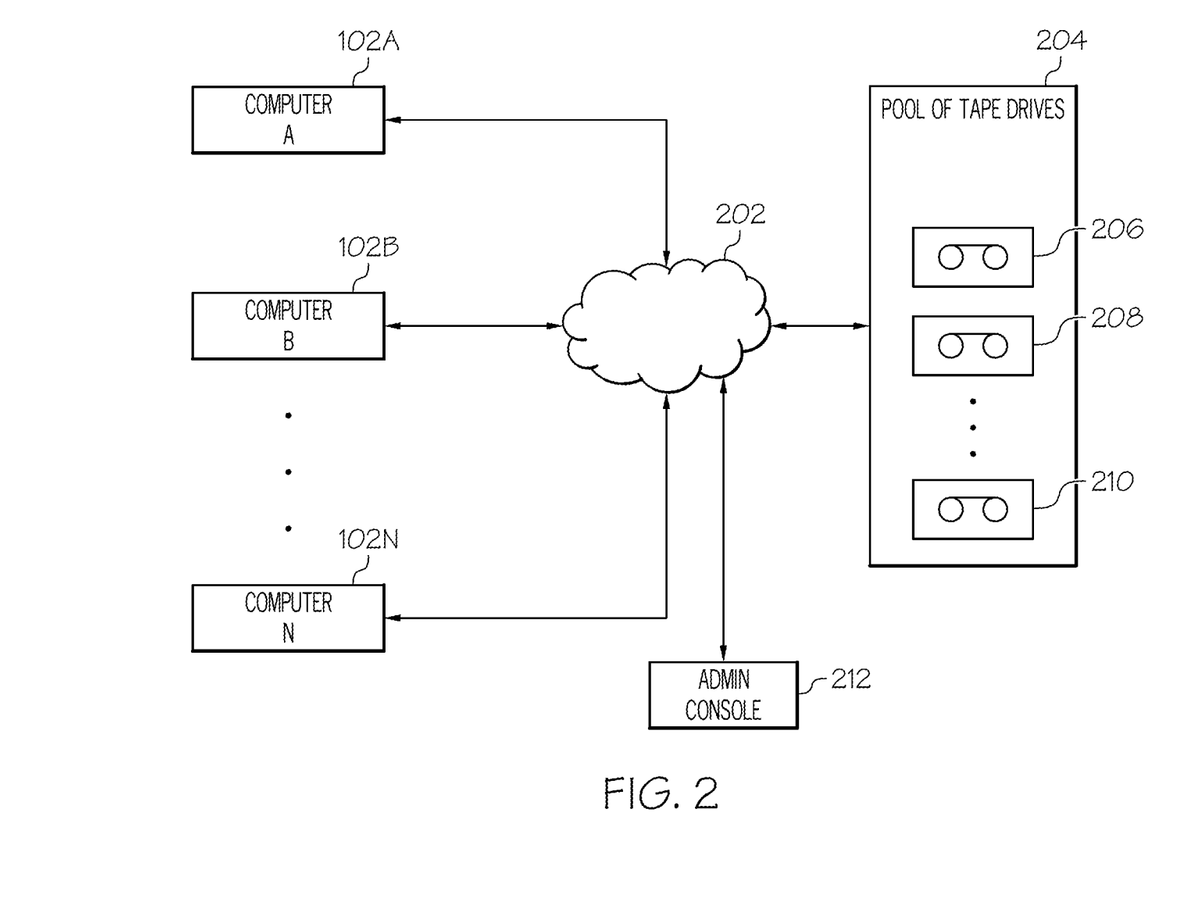
FIG. 2 depicts an example computing environment in which multiple computing systems, as shown in FIG. 1, have access to shared computer resources in accordance with the principles of the present disclosure.

FIG. 2 depicts an example computing environment in which multiple computing systems, as shown in FIG. 1, have access to shared computer resources in accordance with the principles of the present disclosure. In the environment of FIG. 2, a plurality of computer systems 102A, 102B, 102N can be deployed that are similar to the computer system 102 described with respect to FIG. 1. These computer systems 102A, 102B, 102N can be networked 202 together so as to share an I/O resource 204. In particular the I/O resource 204 may be a pool of individual tape drives 206, 208, 210. A first job executing on computer A 102A may cause generation of an allocation request for tape drive 206 while a second job executing on computer B 102B may cause generation of its own allocation request for tape drives 206 and 208. Because these two allocation requests involve at least some overlap, both allocations cannot concurrently occur without likely resulting in data corruption. Accordingly, a respective access serializer on each of computer A 102A and computer B 102B coordinate over the network 202 to serialize the allocation of the I/O resource 204 so that both allocations can occur, but occur sequentially. One of ordinary skill will recognize that the pool of tape drives 204 may be physical tapes drives, virtual tape drives, or a combination of both and can be other computer resources as well. Similarly, the respective allocation requests for the tape drives may come from one application on one computer system and a different application on another computer system, and may also come different applications executing on a single computer system (e.g., computer N 102N).

The environment of FIG. 2 can also include an administrator console 212 that could be located either remotely or locally to one or both of the tape drive pool 204 and the computer systems 102A, 102B, 102N. The administrator console 212 can transmit and receive messages to and from the computer systems 102A, 102B, 102N even though the administrator console 212 may not directly or indirectly access the tape drive pool 204. Although only one tape drive pool 204 and one administrator console 212 are shown in FIG. 2, one of ordinary skill will recognize that more than one of these entities can be provided without departing from the scope of the present disclosure.

Figure 3A:
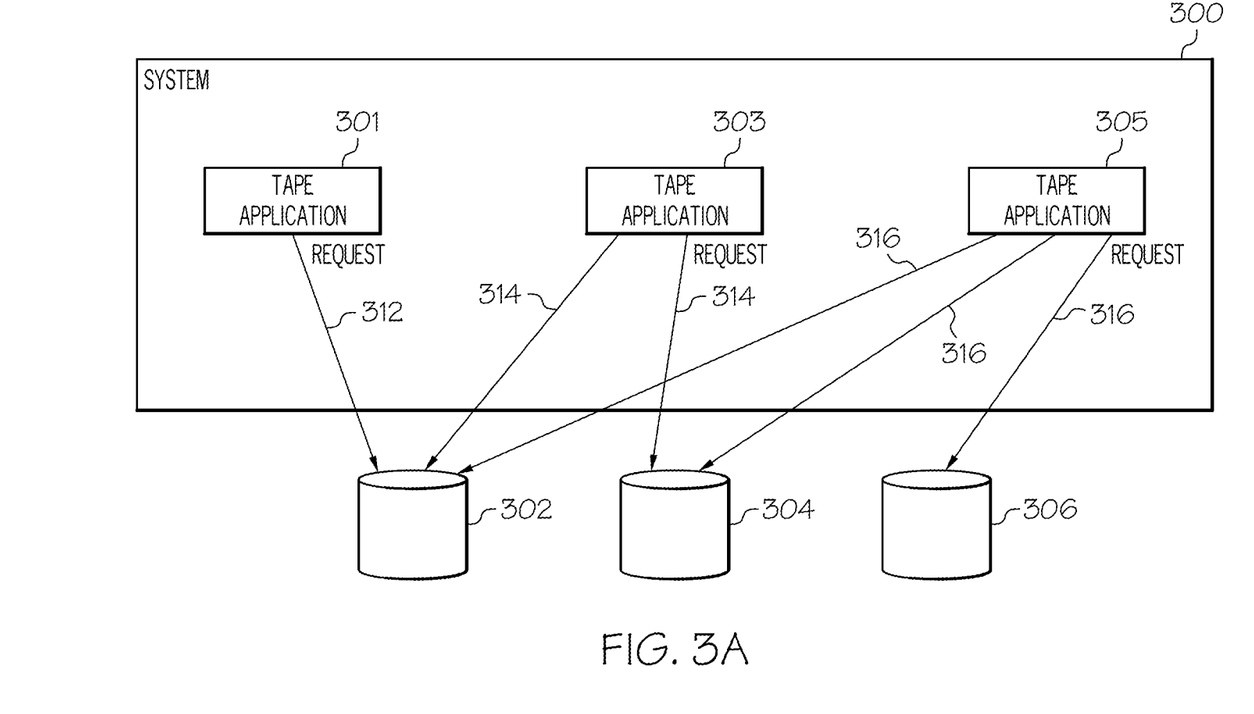
FIG. 3A illustrates an example environment in which thrashing can occur in accordance with the principles of the present invention.

One example of a type of unwanted delay that can occur when using device allocation serializer software is known as "thrashing" or "allocation deadlocks" and can be better understood by referring below to a specific example that involves three different tape applications and tape devices. Thrashing can be the result of tape applications on a system 300 continuously entering/exiting allocation without being able to satisfy their tape allocation requests. Thrashing can be considered an allocation deadlock in the sense that the tape applications cannot proceed because there are insufficient resources available to satisfy the allocation requirements of their current request. One of ordinary skill will recognize that below is merely one example of thrashing and more tape applications or more serial devices can be involved with thrashing events as well.

FIG. 3A illustrates an example environment in which thrashing can occur in accordance with the principles of the present invention. Initially, Tape Application 301 successfully allocates Tape Device 302 after sending a request 312. Tape Application 303 may then attempt to allocate Tape Devices 302 and 304 with a request 314. However, Tape Device 302 is unavailable and so the operating system generates a query (that can be replied to by an operator or programmatically) as to whether the requesting Tape Application 303 should "WAIT" or be "CANCELLED". Thus, in response to the query, Tape Application 303 can enter a "WAIT" condition which generates another system query as to whether Tape Application 303 wants to "HOLD" or "NOHOLD". "HOLD" is a condition in which the Tape Application 303 reserves a device exclusively preventing other tape applications from allocating the device. A "NOHOLD" condition causes the Tape Application 303 release requested but not allocated devices so that the devices are available for other tape applications.

When Tape Application 303 is in a WAIT/NOHOLD condition it will wait for the requested devices 302, 304 until they become available.

Tape Application 305 may also issue a request 316 that requests allocation of Tape Device 302, Tape Device 304 and Tape device 306. Just like Tape Application 303, Tape Application 305 is unable to allocate Tape Device 302 and can enter a "WAIT/NOHOLD" condition as well. One of the side-effects of the NOHOLD notification resulting from the messages of Tape Application 305 is that any tape applications WAITing on tape devices that are included in the request 316 are awoken (i.e., POSTed) out of their own WAIT condition.

When Tape Application 303 is awoken it will attempt to allocate Tape Device 302 and Tape Device 304 as part of its initial request 314 that it is trying to complete. If either Tape Device (e.g., 302, 304) is allocated to another tape allocation, then Tape Application 303 will repeat the above steps and re-enter a WAIT/NOHOLD condition. However, the notification message resulting from Tape Application 303 entering a NOHOLD condition awakens Tape Application 305 and the cycle repeats indefinitely for Tape Applications 303 and 305 until Tape Device 302 becomes available or the Tape Applications (e.g., 303, 305) are cancelled.

In accordance with the principles of the present disclosure, the delay detection and notification (DDN) component 110 of the access serializer 108 can collect information about Tape Application 303 and Tape Application 305 as they "thrash" as described above while attempting to allocate one or more tape devices. In particular, the DDN component 110 can collect information about what Tape Applications (e.g., task ID) are making allocation requests, what tape devices are being requested by each tape application, and a respective time of each of the events.

With the information collected by the DDN component 110, an allocation deadlock algorithm can be implemented to determine if tape applications are requesting the same set or subset of tape devices that a still active tape application is also requesting or has requested. By observing and recording multiple occurrences of Request-WAIT-NO-HOLD-POST loops and detecting that the tape applications are competing for a same set of tape devices, the allocation deadlock algorithm can determine that a deadlock (e.g., thrashing) is occurring.

When an allocation deadlock of this nature is occurring, a notification message can be generated and sent to not only the system on which the deadlock is occurring but also to all the other systems (See FIG. 2 102A, 102B, 102N) that have serialized access to the pool 204 of devices 206, 208, 210. An example notification message can identify tape application names, the number of "loops" that have occurred, the amount of time the deadlock has been occurring, and the system name on which the deadlock is occurring.

An example environment involving the z/OS operating system is described below to provide additional concrete examples of how WAIT/NOHOLD looping (e.g., thrashing) can be detected. As mentioned, thrashing can occur when a set of tape applications (e.g., referred to as "jobs" in z/OS) contain one or more DD statements such that a job is not able to allocate all tape devices referenced in its DD statements. In response to a job issuing such a DD statement, a system allocation recovery message (e.g., IEF238D) is generated to which the operator who is monitoring the job, or an automatic software response mechanism, replies with a "WAIT" response. A subsequent allocation recovery message (e.g., IEF433D) is generated to which the operator (or software) can respond with "NOHOLD".

One result of this sequence is that the original job will issue a post-waiting for devices (PWD) call that awakens any other job that is WAITing for one of the devices in the original job's DD statement. The original job will also issue a waiting for devices (WFD) call that causes the job to wait until the devices it is requesting become available.

A second job can enter the system that attempts to allocate at least one of the devices that the original job is trying to allocate. If the devices are still unavailable, the second job will issue its own PWD call followed by a WFD call with one result being that the original job will try again to allocate the devices and once again issue a PWD-WFD sequence. Both jobs will continue this loop until the devices become available or one (or both) of the jobs is cancelled.

The DDN component 110 can include a loop detection feature that identifies this scenario by counting a number of the PWD-WFD calls issued by the original job and the second job. Thus, the jobs can be logically grouped together as a "Looping Job Group" (LJG) so that the total number of PWD-WFD calls issued by all the members of a LJG can be tallied. A user can set a predetermined threshold value (e.g., 10) such that if the number of PWD-WFD calls for a LJG exceed that threshold, then an appropriate message can be generated and sent to all systems that may be attempting to allocate one of more of the devices in question.

In z/OS, for example, when "WAIT/NOHOLD" is replied to an allocation recovery message, MVS constructs a "waiting for devices" bit mask that represents the devices that a job is waiting for. This bit mask can be utilized to organize jobs into the LJGs described above. A LJG includes a set of jobs that can, or will, directly or indirectly, POST any of the other jobs in the LJG when a particular job issues a PWD call. The table below is one example of how LJG can be implemented in accordance with the principles of the present disclosure.

| Job | 'Waiting for Devices' Mask | Group (LJG) |
| --- | --- | --- |
| TAPE_A | 00001111000000000000 | 1 |
| TAPE_B | 00000000111100000000 | 1 |
| TAPE_C | 00000011110000000000 | 1 |
| TAPE_D | 00000000000011110000 | 2 |
| TAPE_E | 00000000000011110000 | 2 |
| TAPE_F | 00000000000011110000 | 3 |

The left-most column of the above table identifies 6 different tape jobs that are attempting to allocate one or more devices using access serializer software 108 (See FIG. 1). The middle column represents that the pool of available devices includes 20 different devices (i.e., there are 20 bits in the bit mask each corresponding to a particular device). For each job, a "1" in the bit mask represents that the job includes an allocation request for the device that corresponds to that bit. The right-most column represents how the jobs are logically segregated into "groups" that have overlapping requests. In other words, a group includes those jobs who can cause, directly or indirectly, POSTing to the other jobs in the group. For example, TAPE_A will not POST directly to TAPE_B (or vice versa); however, TAPE_A can POST to TAPE_C which can, in turn, POST to TAPE_B. Thus, TAPE_A, TAPE_B, and TAPE_C are in the same group (e.g., LJG).

For each job, the DDN 110 can detect when a PWD-WFD call sequence occurs and determine which LJG that particular job can belong to. The DDN 110 can increment a counter for an appropriate LJG every time a PWD-WFD call sequence occurs for a job in that LJG. Once that counter exceeds a predetermined (user-settable) threshold, a WAIT/NOHOLD loop detection message can be generated and sent to appropriate entities.

Figure 3B:
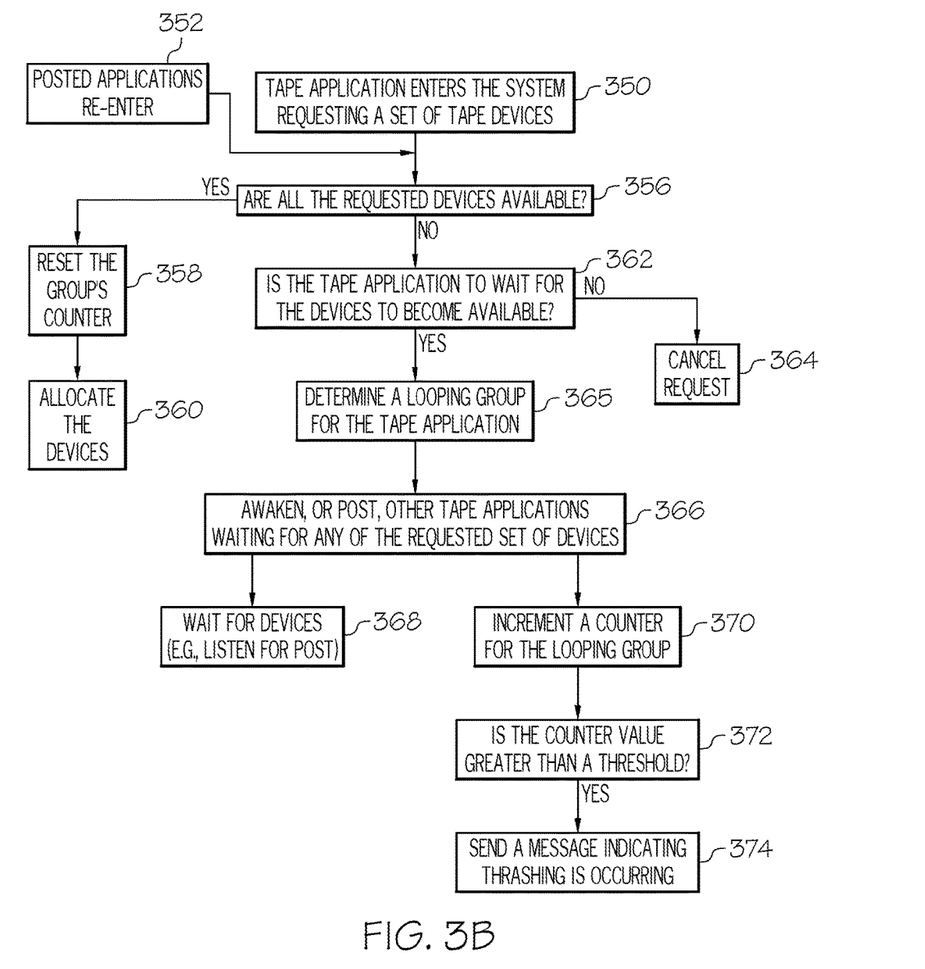
FIG. 3B depicts a flowchart of an example process for detecting thrashing and providing notification of thrashing in accordance with the principles of this disclosure.

The above example is one specific technique for detecting tape device allocation thrashing in the z/OS environment. One of ordinary skill, however, will recognize that a more general approach is possible which can implement similar results in a variety of different operating systems and devices. FIG. 3B depicts a flowchart of an example process for detecting tape device allocation thrashing in accordance with the principles of this disclosure.

In step 350, a tape application initially enters the system requesting a set of tape devices. In addition to this type of tape application, there are also other tape applications that may already have requested tape devices and subsequently entered a WAIT condition. When these second types of tape applications are POSTed, they also can re-enter the logic flow of the flowchart in step 352.

A determination is made, in step 356, as to whether all the devices requested by the tape application are available for allocation. If so, then the devices are allocated in step 360 so that the tape application can perform its function. However, there may have been some previous indication that thrashing could have been occurring related to this tape application or related to the tape devices requested by this tape application. Thus, when this tape application does successfully allocate its requested devices, it indicates that at least for a present moment that thrashing is no longer occurring. Accordingly, in step 358, a counter (or similar indicator) of thrashing related to this tape application is reset.

If all the requested devices are not available for allocation, then in step 362 the tape application indicates whether or not it is going to wait for all the devices to become available. If it is not going to wait, then in step 364 the allocation request is cancelled. If the tape application is going to wait, then in step 365, a looping group of either type of tape application (i.e., a new tape application request or a POSTed tape application that re-enters) is determined. As explained above, tape applications that are requesting an overlapping set of tape devices can be logically grouped together so that their behavior as a group can be monitored. Thus, in step 366 a message or function call is initiated that awakens any other tape applications that are currently WAITing for any of the devices in the set of requested devices. This may cause each of these awoken tape applications to enter the flowchart at step 352.

The tape application, in step 368, enters a WAIT condition where it listens for a POST so that it can try again to allocate its requested set of devices. When the tape application does receive such a POST, then it can repeat the process by re-entering the flowchart at step 352.

The behavior of each tape application is monitored such that if a tape application reaches step 366, then a counter for the looping group (determined in step 365) is incremented in step 370. In other words, reaching step 366 is an indication that the tape application may be contributing to an allocation deadlock. In step 372, a determination is made regarding whether the counter for the looping group is greater than a predetermined threshold. If so, then a message can be sent, in step 374 that alerts other entities that thrashing may be occurring. The message, for example, can include information about the devices involved in the thrashing, the tape applications involved in the thrashing, the length of time of the thrashing, etc.

After step 374 is reached, the tape application or other tape applications in its group can still re-enter the logic flow of FIG. 3B at step 352. If thrashing is still occurring, then steps 370 and 372 will once again be performed upon re-entry and result in another message being sent in step 374. To reduce the number of messages sent, a step (similar to step 358), can be performed after step 374 in which a group's counter is reset to an initial value (e.g., "0"). In this instance, then, thrashing for the group would once again have to occur more than the predetermined threshold number of times before a subsequent message is sent in step 374.

Figure 4:
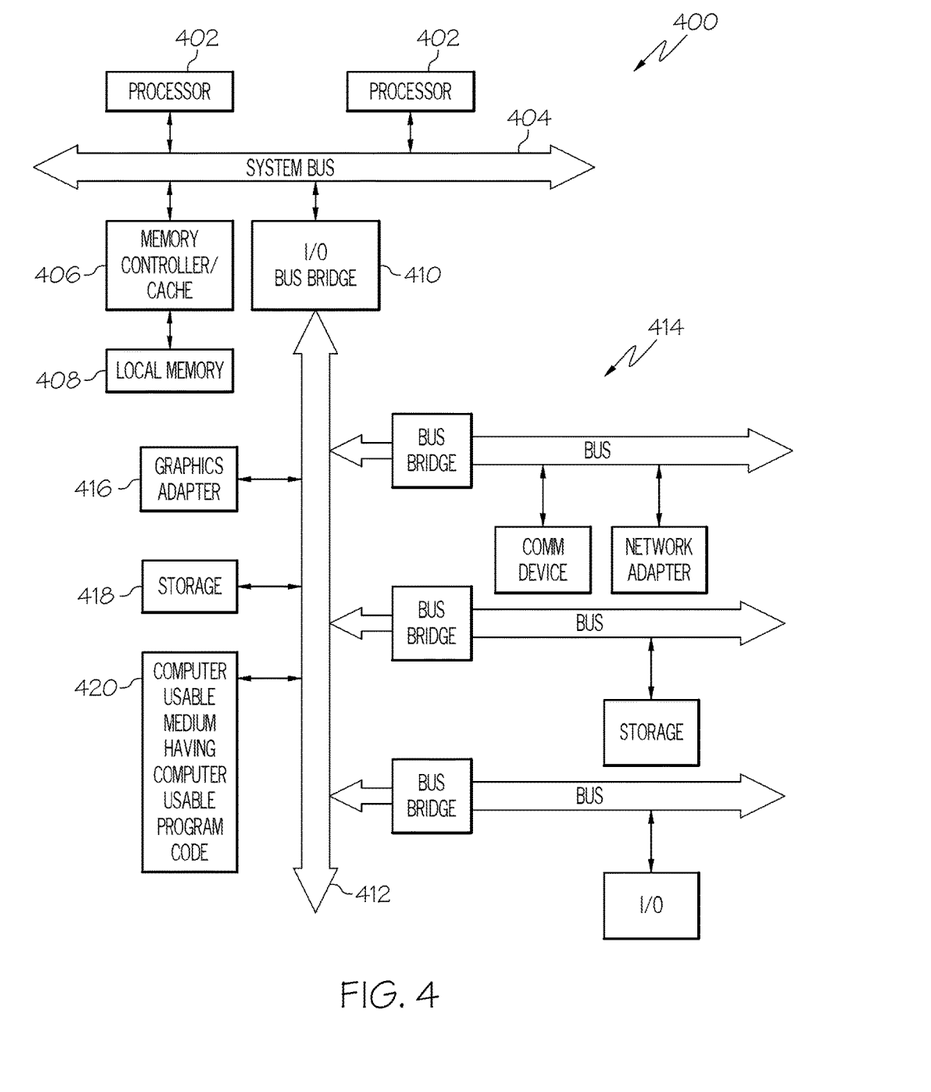
FIG. 4 illustrates a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 102 or aspects thereof, e.g., as set out in greater detail in FIG. 1-FIG. 3B, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3B.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of monitoring resource allocation requests to a plurality of computer resources shared between a plurality of computers, the method comprising:
   detecting, by one computer of the plurality of computers, an allocation request by a first application executing on the one computer for a first set of the plurality of computer resources;
   determining, by the one computer, that the first set of the plurality of computer resources cannot be allocated by the first application because at least one of the first set of the plurality of computer resources is a member of a second set of the plurality of computer resources currently allocated to a second application;
   assigning, by the one computer, the first application to a group comprising one or more applications,
      wherein each member of the group comprises a respective application executing on the one computer having a pending associated allocation request for an associated set of the plurality of computer resources that is unable to be satisfied because of the second set of the plurality of computer resources currently allocated to the second application;
   determining, by the one computer, that the first application generates a function call when the first set of the plurality of computer resources cannot be allocated by the first application,
      wherein the function call comprises data related to instructing each of the other members of the group to resubmit their pending associated allocation request;
   based on the first plurality of computer resources not being allocated by the first application and the first application generating the function call, incrementing a counter value, by the one computer, corresponding to the group;
   determining, by the one computer, that the incremented counter value exceeds a predetermined threshold;
   based on the incremented counter value exceeding the predetermined threshold:
      sending, by the one computer, a message,
         wherein the message comprises information related to a notification that an allocation deadlock loop is occurring in which none of the pending associated allocation requests are satisfied, and
      subsequently determining, by the one computer, that the first application resubmits the allocation request for the first set of the plurality of computer resources.

2. The method of claim 1, wherein determining that the first set of the plurality of computer resources cannot be allocated comprises determining that the first application enters a WAIT condition.

3. The method of claim 1, wherein determining that the first application generates a function call comprises determining that the first application enters a NOHOLD condition.

4. The method of claim 1, comprising:
   analyzing, by the one computer, the first set of the plurality of computer resources; and
   based on the first set of the plurality of computer resources, assigning the first application to the group.

5. The method of claim 4, wherein the first set of the plurality of computer resources directly or indirectly overlaps each of the associated sets of the plurality of computer resources of the other respective applications of the group.

6. The method of claim 1, wherein the message is sent to each of the plurality of computers.

7. The method of claim 1, wherein the message comprises information related to an identification of the first application.

8. The method of claim 1, wherein the message comprises information related to an identification of the first set of the plurality of computer resources.

9. The method of claim 1, comprising:
   subsequent to determining that the first set of the plurality of computer resources cannot be allocated, determining, by the one computer, that the first set of the plurality of computer resources can be allocated by the first application; and
   based on the determination that the first set of the plurality of computer resources can be allocated by the first application, resetting, by the one computer, the counter value to an initial setting.

10. A non-transitory computer-readable medium having instructions stored thereon that are executable by a computing device to perform operations comprising:
   monitoring resource allocation requests to a plurality of computer resources shared between a plurality of computers,
   detecting an allocation request by a first application executing on one computer of the plurality of computers for a first set of the plurality of computer resources;
   determining that the first set of the plurality of computer resources cannot be allocated by the first application because at least one of the first set of the plurality of computer resources is currently allocated to a second application;
   assigning the first application to a group comprising one or more applications,
      wherein each member of the group comprises a respective application executing on the one computer having a pending associated allocation request for an associated set of the plurality of computer resources that is unable to be satisfied because of the second set of the plurality of computer resources currently allocated to the second application;
   determining that the first application generates a function call when the first set of the plurality of computer resources cannot be allocated by the first application,
      wherein the function call comprises data related to instructing each of the other members of the group to resubmit their pending associated allocation request;
   incrementing a counter value corresponding to the group when both:
      the first set of the plurality of computer resources cannot be allocated, and
      the first application generates the function call;
   resetting the counter value to an initial setting when the pending associated allocation request of one of the members of the group is satisfied; and
   sending a message when the counter value exceeds a predetermined threshold, wherein the message comprises information related to a notification that an allocation deadlock loop is occurring in which none of the pending associated allocation requests are satisfied, and subsequently determining, by the one computer, that the first application resubmits the allocation request for the first set of the plurality of computer resources.

11. The non-transitory computer-readable medium of claim 10, having instructions stored thereon that are executable by the computing device to perform operations comprising:

determining that the first application enters a WAIT condition.

12. The non-transitory computer-readable medium of claim 10, having instructions stored thereon that are executable by the computing device to perform operations comprising:

determining that the first application enters a NOHOLD condition.

13. The non-transitory computer-readable medium of claim 10, having instructions stored thereon that are executable by the computing device to perform operations comprising:

analyzing the first set of the plurality of computer resources; and based on the first set of the plurality of computer resources, assigning the first application to the group.

14. The non-transitory computer-readable medium of claim 13, wherein the first set of the plurality of computer resources directly or indirectly overlaps each of the associated sets of the plurality of computer resources of the other respective applications of the group.

15. The non-transitory computer-readable medium of claim 10, wherein the message is sent to each of the plurality of computers.

16. The non-transitory computer-readable medium of claim 10, wherein the message comprises information related to an identification of the first application.

17. The non-transitory computer-readable medium of claim 10, wherein the message comprises information related to an identification of the first set of the plurality of computer resources.

18. The non-transitory computer-readable medium of claim 10, having instructions stored thereon that are executable by the computing device to perform operations comprising:

subsequent to determining that the first set of the plurality of computer resources cannot be allocated, determining that the first set of the plurality of computer resources can be allocated by the first application; and based on the determination that the first set of the plurality of computer resources can be allocated by the first application, resetting the counter value to an initial setting.

19. A system for monitoring resource allocation requests to a plurality of computer resources shared between a plurality of computers, the system comprising:

a processor coupled with a memory;

said memory comprising code executable by the processor, said code configured, when executed, to monitor resource allocation by:

detecting an allocation request by a first application executing on the processor for a first set of the plurality of computer resources;

determining that the first set of the plurality of computer resources cannot be allocated by the first application because at least one of the first set of the plurality of computer resources is currently allocated to a second application;

assigning the first application to a group comprising one or more applications, wherein each member of the group comprises a respective application executing on the processor having a pending associated allocation request for an associated set of the plurality of computer resources that is unable to be satisfied because of the second set of the plurality of computer resources currently allocated to the second application;

determining that the first application generates a function call when the first set of the plurality of computer resources cannot be allocated by the first application, wherein the function call comprises data related to instructing each of the other members of the group to resubmit their pending associated allocation request incrementing a counter value corresponding to the group when both:

the first set of the plurality of computer resources cannot be allocated, and the first application generates the function call; resetting the counter value to an initial setting when the pending associated allocation request of one of the members of the group is satisfied; and sending a message when the counter value exceeds a predetermined threshold, wherein the message comprises information related to a notification that an allocation deadlock loop is occurring in which none of the pending associated allocation requests are satisfied, and subsequently determining, by the one computer, that the first application resubmits the allocation request for the first set of the plurality of computer resources.

20. The system of claim 19, wherein said code is further configured to determine that the first application enters a WAIT condition.

21. The system of claim 19, wherein said code is further configured to determine that the first application enters a NOHOLD condition.

22. The system of claim 19, wherein said code is further configured to:

analyze the first set of the plurality of computer resources; and based on the first set of the plurality of computer resources, assign the first application to the group.

23. The system of claim 22, wherein the first set of the plurality of computer resources directly or indirectly overlaps each of the associated sets of the plurality of computer resources of the other respective applications of the group.

24. The system of claim 19, wherein the message is sent to each of the plurality of computers.

25. The system of claim 19, wherein the message comprises information related to an identification of the first application.

26. The system of claim 19, wherein the message comprises information related to an identification of the first set of the plurality of computer resources.

27. The system of claim 19, wherein the code is further configured to:

subsequent to determining that the first set of the plurality of computer resources cannot be allocated, determine that the first set of the plurality of computer resources can be allocated by the first application; and based on the determination that the first set of the plurality of computer resources can be allocated by the first application, reset the counter value to an initial setting.

\* \* \* \* \*